United States Patent
Burford et al.

(10) Patent No.: US 7,255,258 B2
(45) Date of Patent: Aug. 14, 2007

(54) SYSTEM AND ASSOCIATED FRICTION STIR WELDING (FSW) ASSEMBLY, CONTROLLER AND METHOD FOR PERFORMING A FRICTION STIR WELDING OPERATION

(75) Inventors: Dwight A. Burford, Wichita, KS (US);
Edwin H. Fenn, Wichita, KS (US);
Danny R. High, Wichita, KS (US);
Robert M. Kay, Wichita, KS (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 10/706,480

(22) Filed: Oct. 27, 2003

(65) Prior Publication Data

US 2004/0129763 A1   Jul. 8, 2004

(51) Int. Cl.
B23K 37/00 (2006.01)
B23K 20/12 (2006.01)
B23K 31/02 (2006.01)
(52) U.S. Cl. .................. 228/2.1; 228/112.1
(58) Field of Classification Search .............. 228/2.1, 228/112.1, 114.5; 700/212, 147
See application file for complete search history.

(56) References Cited

U.S. PATENT DOCUMENTS

| | | | |
|---|---|---|---|
| 4,757,932 A | 7/1988 | Benn et al. | |
| 5,460,317 A | 10/1995 | Thomas et al. | |
| 5,697,544 A | 12/1997 | Wykes | |
| 5,718,366 A | 2/1998 | Colligan | |
| 5,794,835 A | 8/1998 | Colligan et al. | |
| 5,971,252 A | 10/1999 | Rosen et al. | |
| 6,045,027 A | 4/2000 | Rosen et al. | |
| 6,050,475 A * | 4/2000 | Kinton et al. ............ | 228/112.1 |
| 6,070,784 A | 6/2000 | Holt et al. | |
| 6,138,895 A | 10/2000 | Oelgoetz et al. | |

(Continued)

FOREIGN PATENT DOCUMENTS

EP   0 968 788 A2   1/2000

(Continued)

OTHER PUBLICATIONS

*Travel to Fixed Stop (F1)—Detailed Description; Description of Function Basic Machine (FB1)*; Sep. 2001; Chapter 2; 8 pages; Siemens AG.

(Continued)

*Primary Examiner*—Jonathan Johnson
(74) *Attorney, Agent, or Firm*—Alston & Bird LLP

(57) ABSTRACT

A system and associated friction stir welding (FSW) assembly, controller and method for performing a friction stir welding operation are provided. The friction stir welding system includes a FSW device, such as a CNC machine, that includes an actuator capable of moving a FSW tool relative to a workpiece. The system also includes a controller capable of controlling the FSW device to drive the actuator to move the FSW tool. In this regard, the actuator is capable of being driven such that the FSW tool is capable of performing a friction stir welding operation on the workpiece. The controller is capable of monitoring a torque of the actuator to thereby control the FSW device to drive the actuator such that the torque is maintained within a range about a torque setting.

20 Claims, 6 Drawing Sheets

U.S. PATENT DOCUMENTS

| | | |
|---|---|---|
| 6,199,745 B1 * | 3/2001 | Campbell et al. ........ 228/112.1 |
| 6,237,835 B1 | 5/2001 | Litwinski et al. |
| 6,325,273 B1 * | 12/2001 | Boon et al. .............. 228/112.1 |
| 6,367,681 B1 | 4/2002 | Waldron et al. |
| 6,398,883 B1 | 6/2002 | Forrest et al. |
| 6,460,752 B1 | 10/2002 | Waldron et al. |
| 6,484,924 B1 | 11/2002 | Forrest |
| 6,497,355 B1 * | 12/2002 | Ding et al. .................. 228/2.1 |
| 6,595,403 B2 * | 7/2003 | Okamura et al. ........ 228/112.1 |
| 6,708,865 B2 * | 3/2004 | Yoshinaga ............... 228/112.1 |
| 6,729,526 B2 * | 5/2004 | Okamoto et al. ........ 228/112.1 |
| 6,742,696 B2 * | 6/2004 | Thompson .................. 228/103 |
| 6,886,732 B2 * | 5/2005 | Yoshinaga .................. 228/2.3 |
| 2002/0050508 A1 | 5/2002 | Yoshinaga |
| 2002/0190103 A1 | 12/2002 | Yoshinaga |
| 2003/0047584 A1 | 3/2003 | Okamoto et al. |
| 2003/0047590 A1 | 3/2003 | Okamoto et al. |
| 2004/0173663 A1 * | 9/2004 | Okamoto et al. ........ 228/112.1 |
| 2005/0001010 A1 * | 1/2005 | Koga et al. ................. 228/2.1 |
| 2005/0040209 A1 * | 2/2005 | Stotler et al. ............... 228/102 |

FOREIGN PATENT DOCUMENTS

| | | |
|---|---|---|
| EP | 1 281 468 A2 | 2/2003 |
| JP | 61253189 A | 11/1986 |
| JP | 09248678 A | 2/1997 |

OTHER PUBLICATIONS

Remarks regarding Inquiry from Japanese Patent Office; 2 pages; Aug. 2006.

Takashi Kitahara, Kazuyoshi Katoh, Hiroshi Tokisue; *Some Characteristics of Friction Stir Welded AZ*31 *Magnesium Alloy Joint*; Summary of Japan Welding Society National Convention Lectures; Japan Welding Society, Mar. 2001; 3 pages; vol. 68.

Masami Tsubaki, Masahiro Fukumoto, Toshiaki Yasui; *Evaluation of Joining Property Between Steel and Aluminum by Friction Stirring*, Summary of Japan Welding Society National Convention Lecutures, Japan Welding Society; Mar. 2003; 3 pages; vol. 72.

* cited by examiner

SYSTEM AND ASSOCIATED FRICTION STIR WELDING (FSW) ASSEMBLY, CONTROLLER AND METHOD FOR PERFORMING A FRICTION STIR WELDING OPERATION

FIELD OF THE INVENTION

The present invention generally relates to systems and methods of friction stir welding and, more particularly, relates to systems and methods of controlling equipment used to perform a friction stir welding operation.

BACKGROUND OF THE INVENTION

Friction stir welding is a relatively new process using a rotating tool to join two workpieces in a solid state. For example, such a process is described in U.S. Pat. No. 5,460,317 to Thomas et al., the contents of which are hereby incorporated by reference in its entirety. When using friction stir welding to join two workpieces, or repair cracks in a single workpiece, one of the primary parameters that typically must be monitored and controlled is the force exerted by the tool on the workpieces or workpiece. The magnitude of the force exerted by the tool must be maintained above a prescribed minimum in order to generate the required frictional heating of the workpieces. When linearly joining two workpieces, the tool is typically plunged by the friction stir welding machine to a depth necessary to produce the required force to generate the frictional heating. Once that force is achieved, it is continuously monitored to ensure sufficient force is maintained.

Whereas conventional systems for performing friction stir welding can adequately join workpieces or repair cracks in a single workpiece, such systems have drawbacks. In this regard, conventional systems are typically comprised of costly, dedicated machinery for performing friction stir welding. More particularly, as the force exerted by the tool on the workpiece(s) is one of the primary parameters that typically must be monitored and controlled when using friction stir welding, conventional systems for performing friction stir welding typically require a dedicated means for measuring such force. For example, conventional systems typically require devices such as strain gauge load cells, piezoelectric load cells, dynamometers, pneumatic load cells and/or hydraulic load cells to measure the force generated by the tool on the workpiece(s). And in the absence of such dedicated means for measuring force, conventional systems require a means for position control to control the force exerted by the tool on the workpiece(s). More particularly, other conventional systems require a means for controlling the position of the tool with respect to the workpiece(s) thereby assuming proper force is exerted by the tool.

In addition to the foregoing drawback, such conventional systems typically include costly machines dedicated to friction stir welding operations. In this regard, many times such machines may have significant downtime between friction stir welding operations, which further reduces manufacturing efficiency, and decreases flexibility of the machines used for manufacturing.

SUMMARY OF THE INVENTION

In light of the foregoing background, embodiments of the present invention provide an improved system and associated friction stir welding (FSW) assembly, controller and method for performing a friction stir welding operation. In accordance with embodiments of the present invention, the forces exerted by a friction stir welding tool, which control the depth the tool is plunged into the material of the workpiece, the speed at which the tool passes along a weld path and/or the rotational speed of the tool, can be indirectly controlled based upon the torques of various actuators (e.g., motors) providing movement of the tool relative to the workpiece. Advantageously, by controlling the torques of the actuators, embodiments of the present invention are capable of performing friction stir welding operations without requiring costly, dedicated machinery. More particularly, embodiments of the present invention are capable of controlling the forces exerted by the tool by utilizing FSW devices such as computer numerical control (CNC) machines that do not possess a dedicated means for measuring force, but rather, under normal machine operation, employ position control techniques.

According to one aspect of the present invention, a friction stir welding system is provided. The friction stir welding system includes a friction stir welding (FSW) device that includes an actuator capable of moving a FSW tool relative to a workpiece. The system also includes a controller capable of controlling the FSW device to drive the actuator to move the FSW tool relative to the workpiece. In this regard, the actuator is capable of being driven such that the FSW tool is capable of performing a friction stir welding operation on the workpiece. Advantageously, and in accordance with embodiments of the present invention, the controller is capable of monitoring a torque of the actuator to thereby control the FSW device to drive the actuator such that the torque is maintained within a range about a torque setting.

More particularly, the actuator can comprise any one or more of a plunge actuator, at least one weld actuator and a spindle actuator. The plunge actuator is capable of moving the FSW tool along a plunge axis, the weld actuator(s) are capable of moving the FSW tool along a weld path, and the spindle actuator is capable of rotating the FSW tool relative to the workpiece. Thus, the controller can be capable of controlling the FSW device such that the plunge actuator is driven to move the FSW tool into further contact with the workpiece when the torque of the plunge actuator decreases below a range about a plunge torque setting. Conversely, the controller can be capable of controlling the FSW device such that the plunge actuator is driven to move the FSW tool into reduced contact with the workpiece when the torque of the plunge actuator increases above the range about the plunge torque setting. To prevent the FSW tool from being driven too far into contact with the workpiece, however, when the torque of the plunge actuator decreases below the range about the plunge torque setting, the plunge actuator can be driven to move the FSW tool into further contact with the workpiece until either the torque increases to within the range or the FSW tool has moved more than a defined distance along the plunge axis.

Additionally, or alternatively, the controller can be capable of controlling the FSW device such that the weld actuator(s) are driven to move the FSW tool with increased speed along the weld path when the torque of the weld actuator(s) decrease below a range about respective weld torque setting(s). Conversely, the controller can be capable of controlling the FSW device such that the weld actuator(s) are driven to move the FSW tool with decreased speed along the weld path when the torque of the weld actuator(s) increase above the range about the plunge torque setting.

Further, the controller can additionally, or alternatively, be capable of controlling the FSW device such that the spindle actuator is driven to rotate the FSW tool with decreased rotational speed when the torque of the spindle actuator decreases below a range about a spindle torque setting. Conversely, the controller can be capable of controlling the FSW device such that the spindle actuator is driven to move the FSW tool with increased rotational speed when the torque of the spindle actuator increases above the range about the spindle torque setting.

According to other aspects of the present invention, a stir welding assembly, controller and method for performing a friction stir welding operation are provided.

BRIEF DESCRIPTION OF THE DRAWINGS

Figure 1:
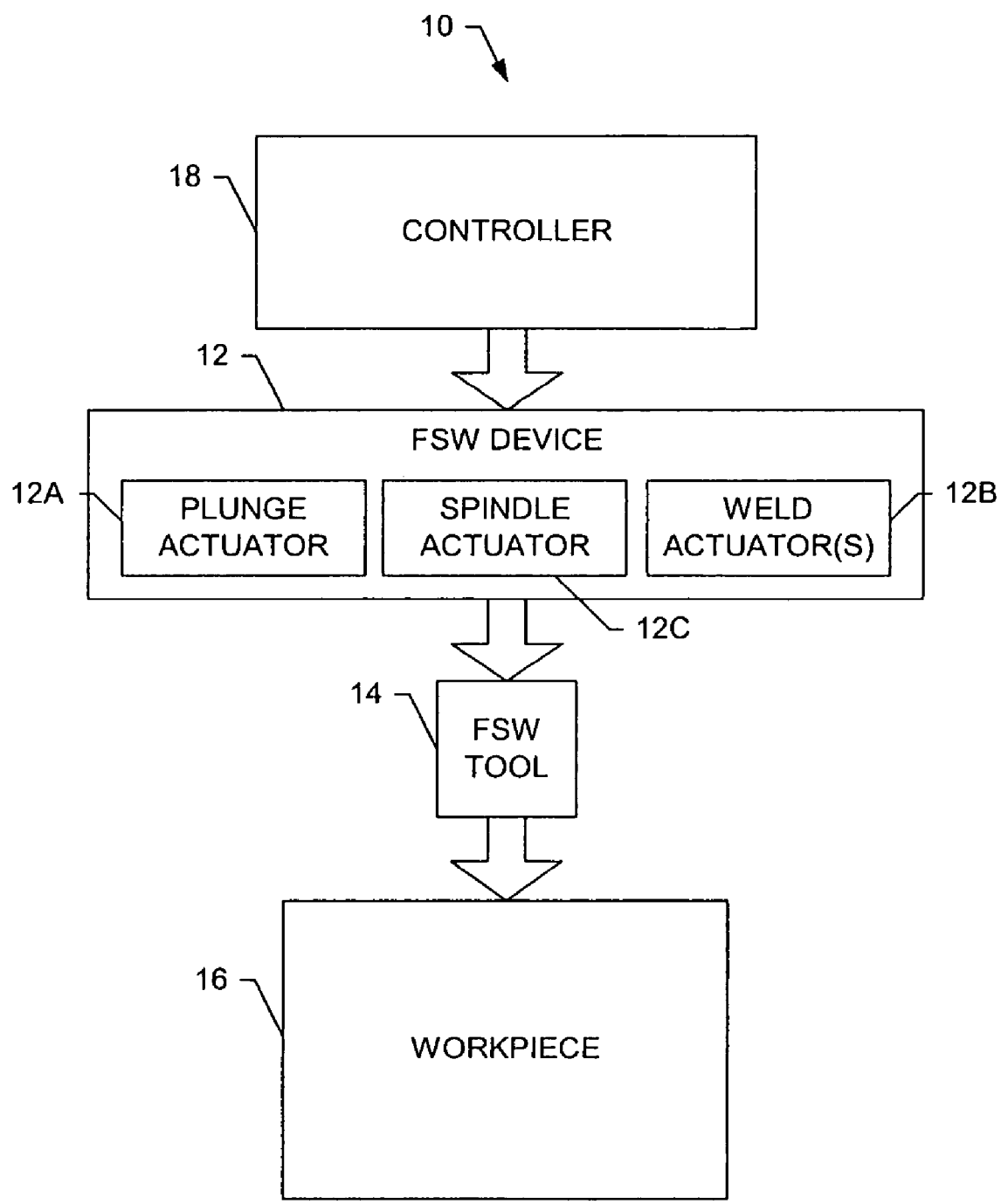
Figure 2:
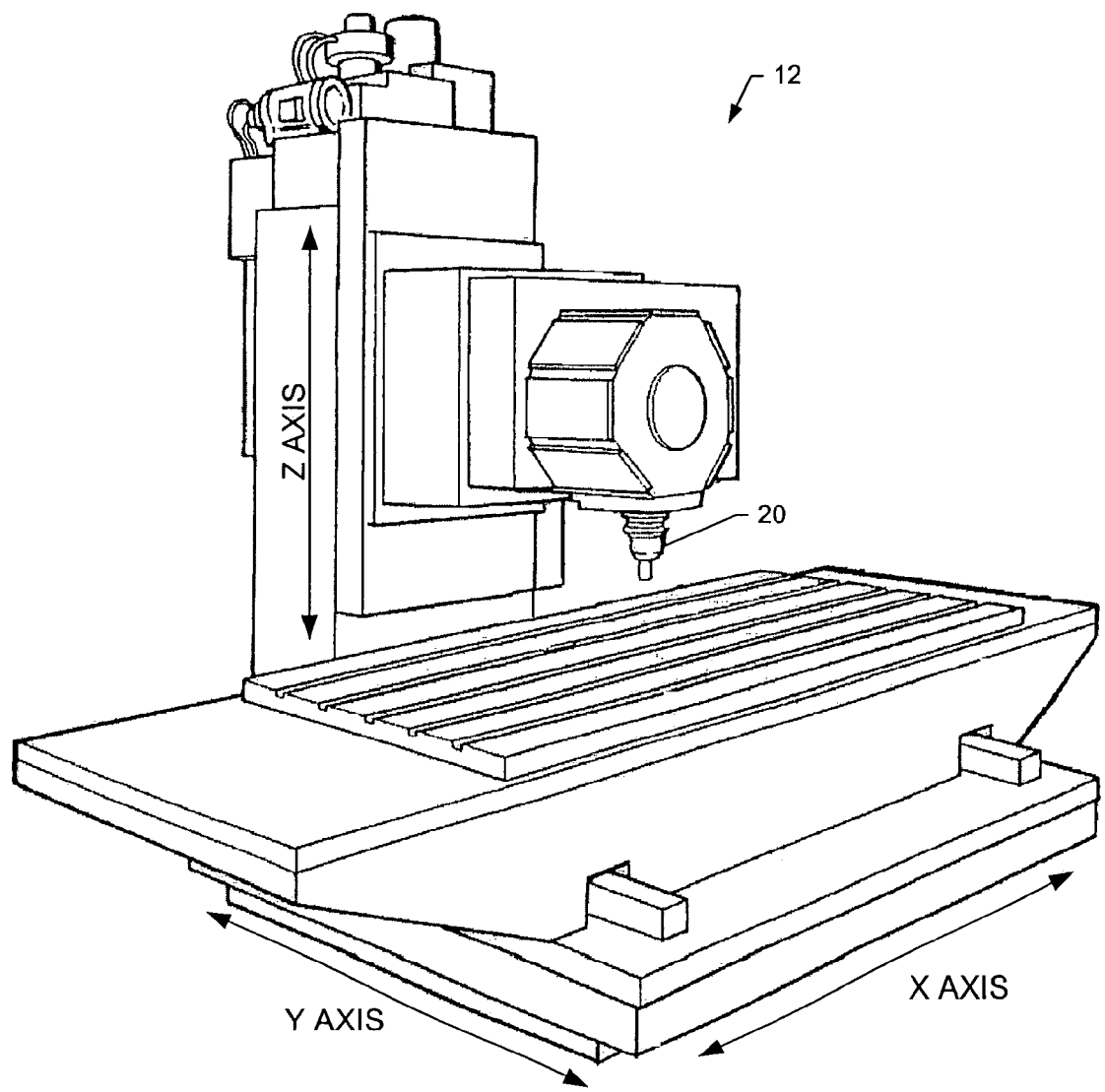
Figure 3A:
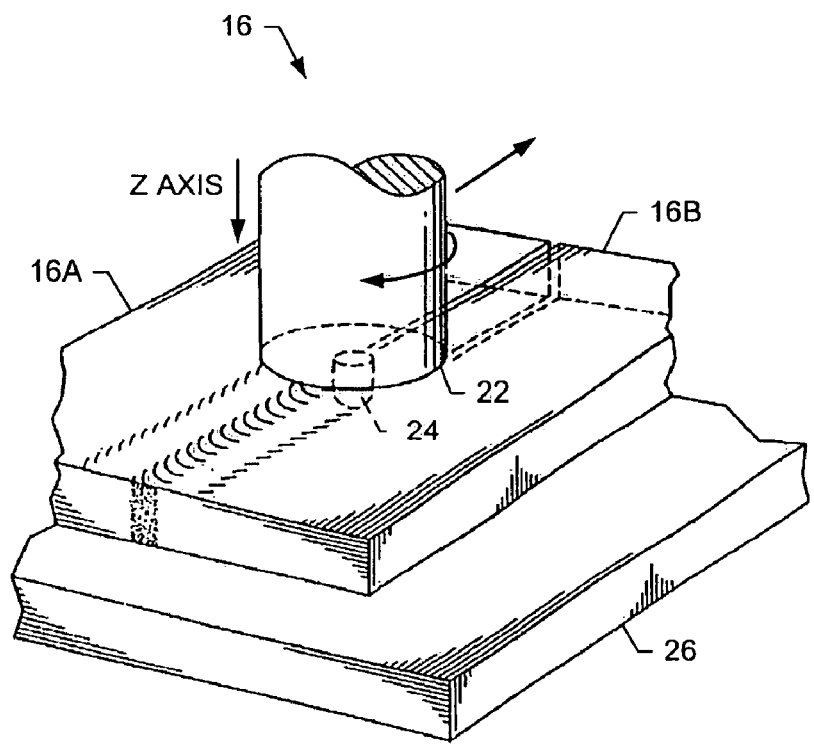
Figure 3B:
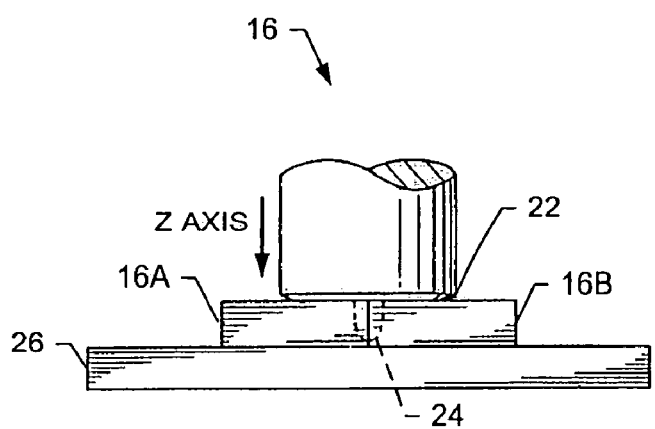
Figure 4:
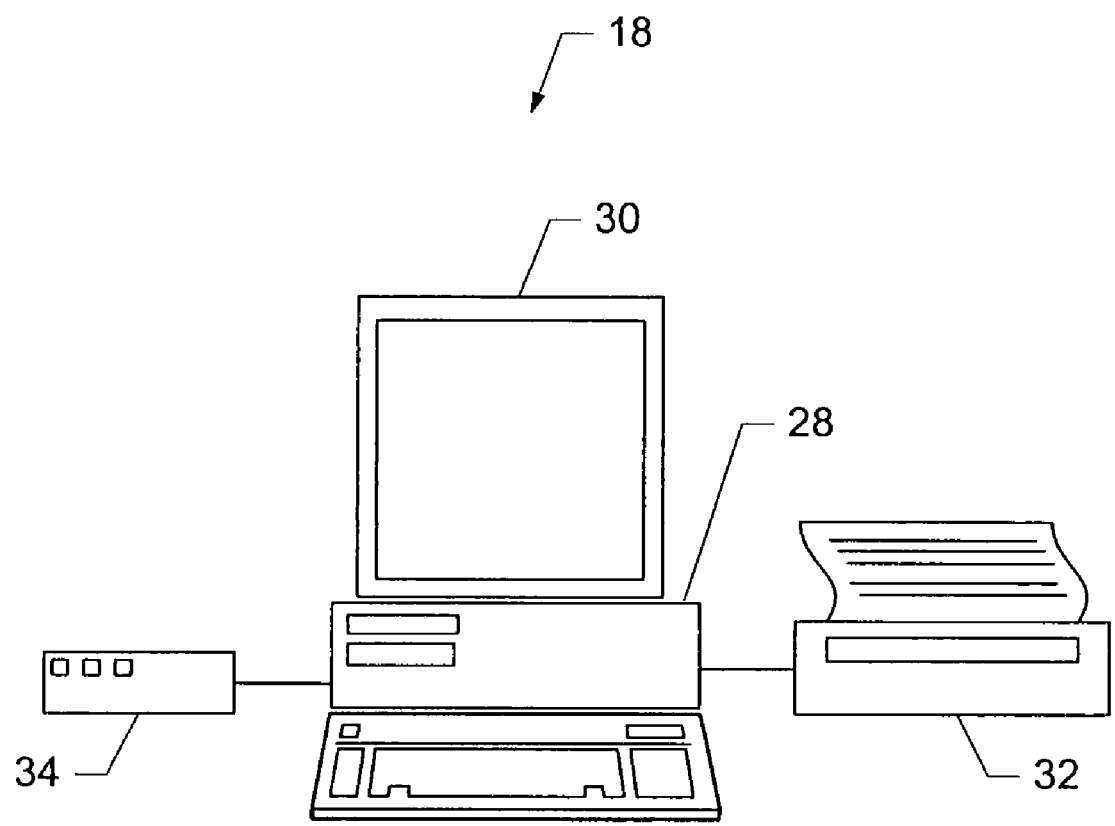
Figure 5:
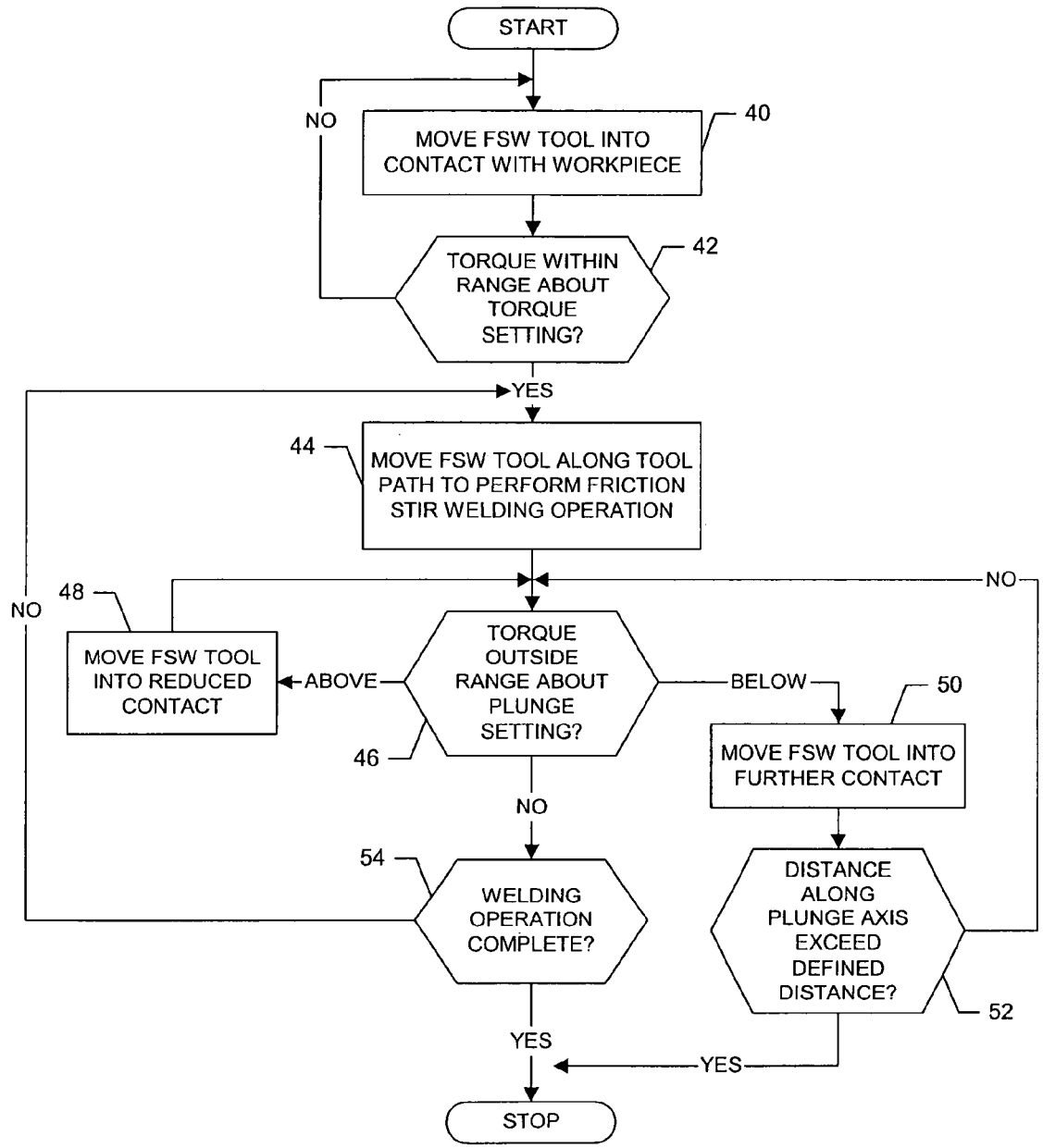
Figure 6:
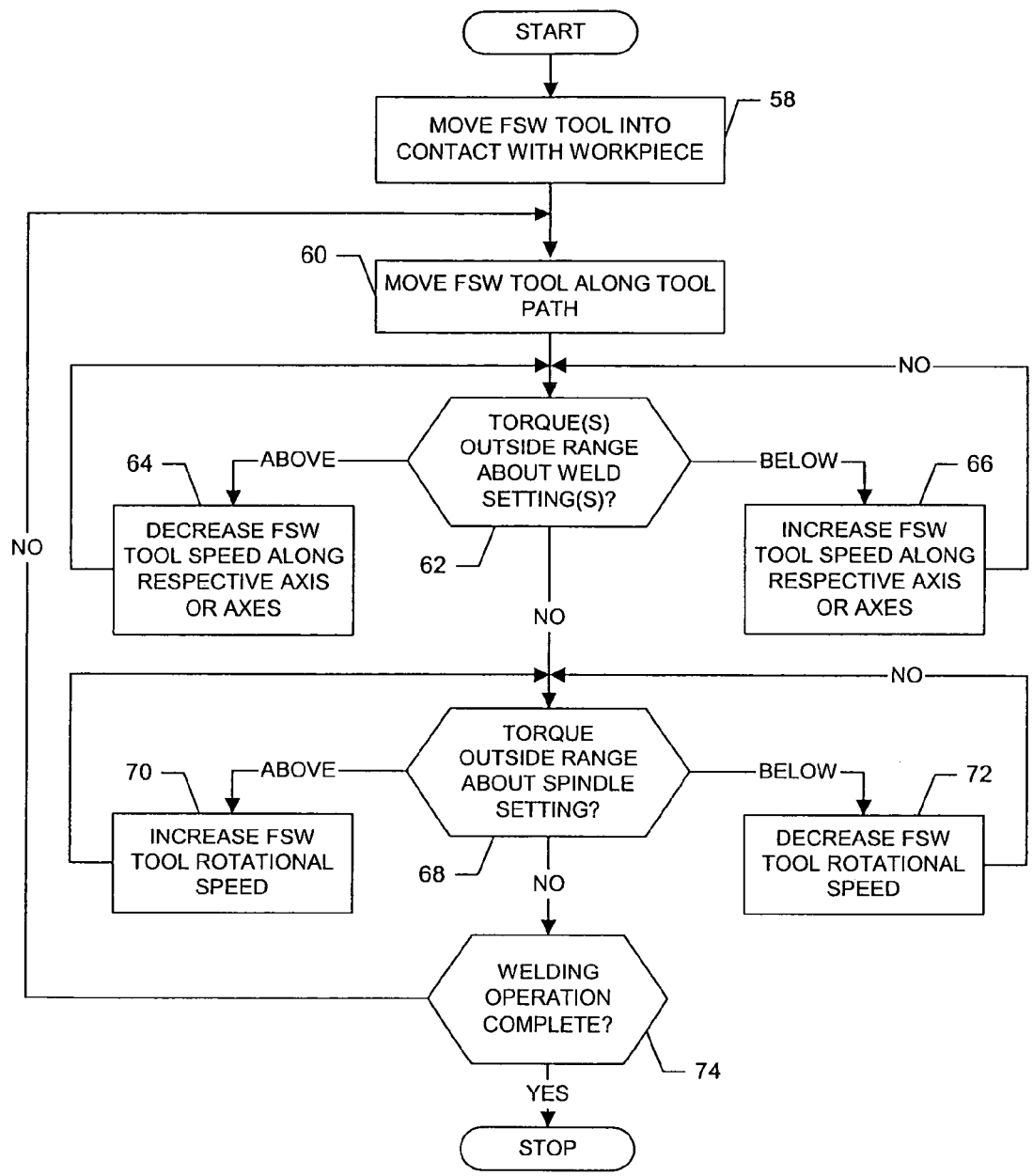

Having thus described the invention in general terms, reference will now be made to the accompanying drawings, which are not necessarily drawn to scale, and wherein:

FIG. 1 is a block diagram of a system for performing a friction stir welding operation in accordance with one embodiment of the present invention;

FIG. 2 is a schematic perspective view of a friction stir welding (FSW) device comprising a CNC mill machine, in accordance with one embodiment of the present invention;

FIGS. 3A and 3B are a schematic perspective view and side view, respectively, of a friction stir welding (FSW) tool and workpiece in accordance with one embodiment of the present invention;

FIG. 4 is a schematic block diagram of a controller in accordance with one embodiment of the present invention;

FIG. 5 is a block diagram illustrating various steps in a method for performing a friction stir welding operation in accordance with one embodiment of the present invention; and FIG. 6 is a block diagram illustrating various steps in a method for performing a friction stir welding operation in accordance with another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 illustrates a system 10 for friction stir welding a workpiece 16 according to one embodiment of the present invention. Generally, the system includes a friction stir welding (FSW) assembly including a FSW device 12 capable of operating a FSW tool 14. More particularly, as explained in more detail below, the FSW device can include a plunge actuator 12A capable of being driven to move the FSW tool along a plunge axis such that the FSW tool can perform a friction stir welding operation on the workpiece. The system also typically includes a controller 18 capable of controlling operation of the FSW device in accordance with embodiments of the present invention. As will be appreciated, in conventional friction stir welding systems, dedicated FSW devices and tools are utilized to perform friction stir welding in accordance with a force control technique. Advantageously, as described below, the FSW device of embodiments of the present invention may comprise a conventional machine, such as a conventional CNC mill machine, translatable about a plurality of axes. In this regard, and in contrast to conventional, dedicated FSW devices, the FSW device can be controlled to apply an appropriate force to the workpiece by controlling the torque of the actuator capable of moving the FSW tool along a plunge axis into contact with the workpiece.

The FSW device 12 can comprise any of a number of different devices capable of operating a FSW tool 14 to perform friction stir welding. For example, FIG. 2 depicts one advantageous type of FSW device capable of operating a FSW tool to perform friction stir welding in accordance with one embodiment of the present invention. The FSW device according to this embodiment generally comprises a computer numerically controlled (CNC) machine that is translatable about a plurality of axes, and can additionally be rotatable about one or more axes. For example, the FSW device can comprise a two-spindle, three-axis CNC machine manufactured by Milacron Inc. of Cincinnati, Ohio. Advantageously, in addition to being capable of performing friction stir welding, the FSW device can be utilized for machining components, assemblies or the like, such as in accordance with conventional CNC techniques.

The illustrated FSW device 12 carries a tool-holding spindle 20 in which the FSW tool 14 can be mounted. In this regard, the spindle can be moved, such as to plunge at least a portion of the FSW tool into the workpiece 16, as described more fully below with respect to FIG. 3. The FSW device in the illustrated embodiment comprises a three-axis vertical CNC mill machine, but the invention is not limited to vertical CNC mill machines, as will be recognized by those skilled in the art. As is known, the machine includes a prime mover and a plurality of rails or ways that define X, Y and Z axes along which the prime mover of the machine can move. The movement of the prime mover and the spindle is provided by suitable actuators, such as motors, all of which provide movements of the device along the X, Y and Z axes and are in communication with the controller 18, which controls movement and positioning of the machine in accordance with embodiments of the present invention. According to one advantageous embodiment, movement of the machine can be controlled by programming a set of numerical control (NC) instructions executed by the controller, where the instructions can be defined relative to an orthogonal coordinate system based on the XYZ axes of the FSW device.

Like the FSW device 12, the FSW tool 14 can comprise any of a number of different tools. For example, as shown in FIGS. 3A and 3B, the FSW tool, which is mounted on the tool-holding spindle (see FIG. 2), can comprise a shoulder 22 at its distal end, and a non-consumable welding probe 24 extending outward centrally from the shoulder. As shown, such as tool can be utilized in accordance with the friction stir welding technique of one embodiment of the present invention to weld a workpiece 16 comprising a pair of plates 16A and 16B. The plates can be formed of a variety of materials including, but not limited to, aluminum, aluminum alloys, titanium, titanium alloys, steel, and the like. Non-metal materials can also be welded with the system 10, e.g., materials such as polymers and the like. Further, the workpiece can include members of similar or dissimilar materials, for example, plates formed of different metals, including metals that are unweldable or uneconomical to join by conventional fusion welding techniques. Unweldable materials, when joined by conventional fusion welding techniques, produce relatively weak weld joints that tend to crack during weld solidification. Such materials include aluminum and some aluminum alloys, particularly AA series 2000 and 7000 alloys. The use of friction stir welding permits workpieces formed of unweldable materials to be securely joined. Friction stir welding also can be used to securely join weldable materials to other weldable and to unweldable materials. Thus, the materials that form the workpiece can be chosen from a wider variety of light weight, high strength metals and alloys, thereby facilitating reduction of the overall weight of the workpiece and a structural assembly formed therefrom.

As shown in FIGS. 3A and 3B, the plates 16A and 16B can be aligned on a backing plate 26 so that edges of the plates to be welded together are held in direct contact, although a sealant may be applied therebetween if so desired. Although the illustrated FSW tool operates with a backing plate, it should be understood that the FSW tool can equally comprise a bobbin style FSW tool, as such are known to those skilled in the art. Briefly, and in accordance with embodiments of the present invention, the controller 18 can control the FSW device 12 to drive the actuator providing movement along a plunge axis, typically the Z axis, to move the rotating FSW tool 14 into contact with the interface of the plates such that the rotating probe is forced into contact with the material of both plates, as shown. Although the FSW device and FSW tool are illustrated and described herein as performing one type of friction stir welding operation (i.e., butt type weld), the same FSW device and FSW tool can be utilized to perform any of a number of other types of friction stir welding operations such as, for example, lap type and/or spot type welding.

As the rotating probe 24 of the FSW tool 14 is forced into contact with the material of the plates 16A, 16B, the rotation of the probe in the material and rubbing of the shoulder 22 against the upper surface of the material can produce a large amount of frictional heating of both the FSW tool and the plate interface. In turn, the heat can soften the material of the plates in the vicinity of the rotating probe and shoulder, causing commingling of material which, upon hardening, can form a weld. The FSW device 12 can move the FSW tool longitudinally along the interface between the plates to thereby form an elongate weld along the interface between the plates. And as the FSW tool moves along the interface between the plates, the shoulder of the welding tool can prevent softened material from the plates from escaping upward, and force the material into the weld joint. Then, when the weld is completed, the FSW device can retract the FSW tool from the workpiece 16.

As indicated above, the system 10 includes a controller 18 capable of controlling operation of the FSW device 12. In this regard, the controller can comprise any of a number of different controllers capable of operating in accordance with embodiments of the present invention, explained in greater detail below. As shown in FIG. 4, for example, the controller can comprise a processing element and an associated memory device, both of which are commonly comprised by a workstation 28 or the like. The processing element can comprise any of a number of different processing elements such as, for example, the SNUMERIK 840D model controller manufactured by Siemens AG of Munich, Germany. The workstation can include a display 30 for presenting information relative to operating the workstation in accordance with embodiments of the present invention. To plot information relative to operating the workstation in accordance with embodiments of the present invention, the workstation can further include a printer 32.

The workstation 28 can also include a means for locally or remotely transferring the information relative to operating the workstation in accordance with embodiments of the present invention. For example, the workstation can include a modem 34 to transfer information to other computers or the like. Further, the workstation can include an interface (not shown) to a network, such as a local area network (LAN), and/or a wide area network (WAN). For example, the workstation can include an Ethernet Personal Computer Memory Card International Association (PCMCIA) card configured to transmit and receive information to and from a LAN, WAN or the like.

Reference is now drawn to FIG. 5, which illustrate various steps in a method for performing a friction stir welding operation in accordance with one embodiment of the present invention. The method generally begins with the controller 18 controlling the FSW device 12 to drive the spindle to rotate the spindle 20 of the FSW device to thereby rotate the FSW tool 14. In this regard, the controller typically controls the FSW to rotate the spindle, and thus the FSW tool, with a constant rotational velocity, which may be determined in accordance with any of a number of conventional techniques. As the spindle rotates the FSW tool, then, the controller can control the FSW device to drive the actuator providing movement along the plunge axis (e.g., Z axis) to move the FSW tool along the plunge axis into contact with the workpiece 16 (e.g., interface of plates 16A, 16B) such that the rotating probe 24 is forced into contact with the workpiece, as shown in block 40. As shown in FIG. 1 and described herein, the actuator of the FSW device moving the FSW tool along the plunge axis will be referred to as the plunge actuator 12A.

As indicated above in the background section, the force exerted by the FSW tool 12 on the workpiece 16 is one of the primary parameters that typically must be monitored and controlled when using friction stir welding. In this regard, the force exerted by the FSW tool is typically monitored and controlled such that an appropriate portion (e.g., probe 24) of the FSW tool is plunged into the material of the workpiece to a depth necessary to perform the friction stir welding operation. In conventional FSW systems, however, monitoring the force exerted by the FSW tool on the workpiece typically requires a dedicated means for measuring such force. And in the absence of such dedicated means for measuring force, conventional FSW systems typically monitor the position of the FSW tool with respect to the workpiece to control the depth at which the appropriate portion of the FSW tool is plunged into the material of the workpiece.

In accordance with embodiments of the present invention, the controller 18 is capable of controlling the depth the probe 24 of the FSW tool that is plunged into the material of the workpiece 16 by controlling the torque of the plunge actuator 12A. Advantageously, by controlling the torque of the plunge actuator, the controller can control the depth of the probe without requiring the FSW device 12 to include a dedicated means for measuring force, and without requiring the depth to be controlled by monitoring the position of the FSW tool. Thus, a CNC machine, which is not configured to measure force, can advantageously be used as the FSW device sine the CNC can measure torque, which can be correlated to force as described below.

The appropriate torque required to plunge the probe into the material of the workpiece to a desired depth necessary to perform the friction stir welding operation, referred to herein as the plunge torque setting, can be determined in any of a number of different manners. According to one embodiment, the plunge torque setting can be determined based upon a relationship between the force exerted by the FSW tool 14 on the workpiece 16 and the torque of the plunge actuator 12A. The relationship between force and torque can be determined in any of a number of manners, such as by calibrating the FSW device 12 for friction stir welding operation. For example, the FSW device can be calibrated by controlling the FSW tool to perform a friction stir welding operation while repeatedly recording the torque of the plunge actuator and the force exerted by the FSW tool (using, for example, a dynamometer) at a number of plunge torque settings. The relationship can be determined between force exerted by the FSW tool and the torque of the plunge actuator. Then, the plunge torque setting can be determined based upon the relationship between torque and force, and based upon the force that must be exerted by the FSW tool on the workpiece to perform the friction stir welding operation, where the force can be determined in accordance with any of a number of conventional techniques.

Irrespective of how the plunge torque setting is determined, as the probe 24 is forced into contact with the workpiece 16, the controller 18 can monitor the torque of the plunge actuator to determine whether the torque is within a range about a plunge torque setting, as shown in block 42. In addition, the controller can monitor the torque before the probe contacts the workpiece, such as by beginning to monitor the torque when the probe reaches a set distance (e.g., fifty thousandths of an inch) from a top surface of the workpiece. The range about the plunge torque setting can comprise any of a number of different ranges, such as a tolerance range that facilitates the FSW device 12 and FSW tool 14 performing friction stir welding operations resulting in robust welds of known properties. As will be appreciated, however, the controller can be determined for exact operation such that the range equals zero and the controller effectively monitors the torque of the plunge actuator to determine whether the torque equals the plunge torque setting.

As will be appreciated, the controller 18 can monitor the torque in any of a number of different manners. According to one embodiment in which a CNC machine serves as the FSW device, for example, the controller monitors the torque by monitoring the power applied to the plunge actuator and a relationship between the power and torque of the plunge actuator. Likewise, the controller can be instructed to monitor the torque in accordance with any of a number of different techniques, such as by executing appropriate NC instructions. In this regard, when the controller comprises the SINUMERIK 840D model controller, the controller can be instructed to monitor the torque by executing a "Travel to Fixed Stop" (FXS) instruction that specifies the distance at which the controller begins monitoring the torque of the plunge actuator, where the distance can define the surface of the workpiece or a predefined spacing thereabove. Thereafter, the controller can be provided with a "Fixed Stop Torque" (FXST) instruction that specifies the plunge torque setting. As will be appreciated by those skilled in the art, the FXS instruction is typically executed by the SINUMERIK 840D model controller during conventional operation to generate defined forces for clamping workpieces. For example, when the FSW device 14 comprises a two-spindle, three-axis CNC machine manufactured by Milacron Inc., the controller can be provided with a FXS instruction specifying a distance of 6.2430 inches above the workpiece 16. Similarly, for example, the controller can be provided with a FXST instruction specifying a torque value of 29.85% of the maximum torque of the plunge axis actuator.

As the plunge actuator 12A is driven with a given torque, the plunge actuator will move the FSW tool 14 along the plunge axis with a force in relation to the plunge actuator torque. And as the plunge actuator forces the FSW tool into contact with the workpiece 16, frictional forces between the FSW tool and the workpiece will increase, thus decreasing the difference between the required forces and the force exerted by the FSW tool, which is controlled by the torque of the plunge actuator. Thus, presuming the probe 24 of the FSW tool contacts the workpiece with the plunge actuator operating with a torque above or within the range about the plunge torque setting, the probe can be plunged into the material of the workpiece until the force exerted by the FSW tool on the workpiece increases to a point (i.e., an equilibrium point) where the force is approximately equal the required force to be exerted by the FSW tool to perform the friction stir welding operation, as shown in blocks 40 and 42. In this regard, the probe can be plunged into the material of the workpiece to the desired depth, as determined to equal the depth at which the force exerted by the FSW tool (controlled by the torque of the plunge actuator) reaches an equilibrium point with respect to the target or desired force between the FSW tool and the workpiece. As such, the torque of the plunge actuator can be monitored to achieve a desired force exerted by the FSW tool on the workpiece.

As explained above, when the rotating probe 24 of the FSW tool 14 is forced into contact with the material of the workpiece 16 (e.g., plates 16A, 16B) to the desired depth, the rotation of the probe in the material and rubbing of the shoulder 22 against the upper surface of the material can produce a large amount of frictional heating of both the FSW tool and the plate interface. In turn, the heat can soften the material of the workpiece in the vicinity of the rotating probe and shoulder, causing commingling of material which, upon hardening, can form a weld.

To form a weld along a specified weld path of the workpiece 16, after the probe 24 of the FSW tool 14 has reached the desired depth, and the generated heat has softened the material of the workpiece, the controller 18 can control the FSW device 12 to drive one or more actuators providing movement of the FSW device along the one or more axes of the weld path to move the spindle 20, and thus the FSW tool 14, along the weld path, as shown in block 44. To form the weld along the weld path, then, as the FSW tool moves along the axis or axes of the weld path, the controller can continue to control the FSW device to drive the plunge actuator 12A so as to maintain the torque of the plunge actuator within the range about the plunge torque setting.

To maintain the torque of the plunge actuator 12A within the range about the plunge torque setting, the controller 18 can continue to monitor the torque of the plunge actuator as the FSW tool 14 moves along the weld path. More particularly, the controller can continue to monitor the torque of the plunge actuator to determine whether the torque remains within the range about the plunge torque setting, as shown in block 46. As the FSW tool 14 moves along the weld path, if the torque of the plunge actuator 12A, as determined by the controller 18, increases above the range about the plunge torque setting, the controller can control the FSW device 12 to drive the plunge actuator to move the FSW tool along the plunge axis to bring the torque back within the range. More particularly, the controller can control the FSW device to drive the plunge actuator to move the FSW tool into reduced contact with the workpiece 16, as shown in block 48. For example, the FSW device can drive the plunge actuator to move the FSW tool along the plunge axis in a direction away from the workpiece. The plunge actuator can continue to move the FSW tool into reduced contact until the controller determines the torque of the plunge actuator is again within the range about the plunge torque setting.

If the torque of the plunge actuator 12A, as determined by the controller 18, decreases below the range about the plunge torque setting, the controller can again control the FSW device 12 to drive the plunge actuator to move the FSW tool along the plunge axis to bring the torque back within the range. In this regard, the controller can control the FSW device to drive the plunge actuator to move the FSW tool into further contact with the workpiece 16, as shown in block 50. For example, the FSW device can drive the plunge actuator to move the FSW tool along the plunge axis to further plunge the probe 24 into the material of the workpiece. The plunge actuator can continue to move the FSW tool into further contact until the controller determines the torque of the plunge actuator is again within the range about the plunge torque setting. Thus, by controlling the torque of the plunge actuator, the controller can indirectly control the force exerted by the FSW tool on the workpiece.

As will be appreciated, in various instances the torque of the plunge actuator 12A may reach a value such that bringing the torque back within the range of the plunge torque setting requires plunging the probe 24 of the FSW tool 14 to an undesirable depth in the material of the workpiece 16. For example, in various instances, to bring the torque back within the range of the plunge torque setting may require plunging the probe to a depth such that a portion of the probe protrudes through an underneath surface of the workpiece and contacts the backing plate 26. To prevent the probe of the FSW tool from plunging into the material of the workpiece to an undesirable depth, as the actuator moves the FSW tool into further contact with the workpiece, the controller can determine whether the FSW tool has moved more than a defined distance, as shown in block 52. The defined distance can be defined in any of a number of different manners, but based upon any appropriate reference point, typically represents a distance over which the FSW tool is permitted to travel without the probe of the FSW tool extending to an undesirable depth in the material of the workpiece.

The controller 18 can be instructed to monitor the defined distance in accordance with any of a number of different techniques, such as by executing appropriate NC instructions. In this regard, when the controller comprises the SINUMERIK 840D model controller, the controller can be instructed to monitor the distance by executing a "Travel to Fixed Stop Window" (FXSW) instruction that specifies a range along the plunge axis the FSW tool is permitted to travel during normal operation. In this regard, the FXSW instruction can be executed in conjunction with an FXS instruction that provides the reference point for the range specified by the FXSW instruction. For example, when the FSW device 14 comprises a two-spindle, three-axis CNC machine manufactured by Milacron Inc., and the workpiece has a thickness of 0.100 inches, the controller can be provided with a FXSW instruction specifying a range 0.20 inches, which is typically dependent upon the starting point (e.g., FXS instruction).

Irrespective of how the controller monitors the defined distance, if the FSW tool 14 is moved into contact with the workpiece 16 such that the FSW tool, or more particularly the probe 24, exceeds a depth in the material of the workpiece (depth being defined by the defined distance), the plunge actuator 12A can be driven to move the FSW tool to thereby cease the friction stir welding operation. The plunge actuator can move the FSW tool to cease the friction stir welding operation in any of a number of different manners. For example, the plunge actuator can retract the FSW tool from the workpiece until the FSW tool no longer contacts the workpiece. In such instances, as will be appreciated, the plunge actuator can move the FSW tool away from the workpiece as the FSW tool continues to rotate such that the probe of the FSW tool does not get stuck when the softened material hardens.

As explained above, the FSW tool 14 can be controlled by controlling the torque of the plunge actuator 12A to move the FSW tool along the plunge axis. As will be appreciated, however, the quality of a friction stir welding operation can also be affected by the travel speed of the FSW tool along a weld path of the workpiece 16. In addition, the quality of a friction stir welding operation can be affected by the rotational speed of the spindle 20 of the FSW device 12, and thus the rotational speed of the FSW tool. As such, in accordance with embodiments of the present invention, the controller 18 can additionally, or alternatively, control the torque of one or more actuators providing movement of the FSW tool along the weld path. The weld path typically includes portions along the X and/or Y axes (see FIG. 2). It should be understood, however, that the weld path can include portions along any one or more axes.

In addition to, or in lieu of, controlling the torque of the actuator(s) providing movement along the weld path, the controller 18 can be capable of controlling the torque of the actuator providing rotational movement of the spindle, and thus the FSW tool 14. As used herein, the one or more actuators providing movement of the FSW tool along the weld path may be referred to as the weld actuator(s) 12B, as shown in FIG. 1. Similarly, the actuator providing rotational movement of the FSW tool may be referred to as the spindle actuator 12C, also shown in FIG. 1.

As described herein, the tool path may include portions along two axes (e.g., X and Y axes), and thus the FSW device 12 may include two weld actuators 12B. It should be understood, however, that the tool path may be linear along one or the other of the two axes without including a portion along the other axis. In such instances, the FSW device may include only one weld actuator, which is capable of providing movement of the FSW tool along the linear axis of the tool path. Alternatively, the FSW device may include two weld actuators, with the weld actuator providing movement along the linear axis of the tool path driven with a torque as described below, and the other weld actuator driven with a torque of zero (i.e., controlled to remain stationary).

More particularly as to controlling the weld actuator(s) 12B, the controller 18 can control the torque of the weld actuator(s) to control the speed of the FSW tool 14 as the FSW tool moves along the weld path, and thus the forces exerted by the FSW tool on the workpiece 16 along the weld path, in performing the friction stir welding operation. In this regard, the controller 18 is capable of controlling the speed of the FSW tool 14, and thus the probe 24 of the FSW tool, as the FSW tool travels along the weld path of the workpiece 16 by controlling the torque of the weld actuator(s) 12B. Similarly, the controller 18 can control the torque of the spindle actuator to control the rotational speed of the FSW tool 14 as the FSW tool moves in contact with the workpiece, and thus the rotational forces exerted by the FSW tool on the workpiece 16. As explained above, by controlling the torque of the weld actuator(s) and the spindle actuator, the controller can control the speed of the probe along the weld path, as well as the rotational speed of the probe, without requiring the FSW device 12 to include a dedicated means for measuring force.

The appropriate torque required to move the probe along the weld path of the workpiece at a desired speed necessary to perform the friction stir welding operation, referred to herein as the weld torque setting for a respective weld actuator, can be determined in any of a number of different manners. Similarly, the appropriate torque required to rotate the FSW tool 14 at a desired speed, referred to herein as the spindle torque setting, can be determined in any of a number of different manners. According to one embodiment, the weld torque setting for each weld actuator can be determined based upon a relationship between the force exerted by the FSW tool on the workpiece 16 along the respective axis of the weld path and the torque of the weld actuator. Likewise, according to one embodiment, the spindle torque setting for the spindle actuator can be determined based upon a relationship between the rotational force exerted by the FSW tool on the workpiece and the torque of the spindle actuator.

The relationships between force and torque can be determined in any of a number of manners, such as in the manner described above. For example, the FSW device 12 can be calibrated by controlling the FSW tool 14 to perform a friction stir welding operation along a weld path while repeatedly recording the torque of each weld actuator 12B and the force exerted by the FSW tool along each axis, as well as the torque of the spindle actuator 12C and the rotational force exerted by the FSW tool on the workpiece 16, at a number of torque settings. The relationships can be determined between the force exerted by the FSW tool along each axis and the torque of the weld actuator, and between the rotational force exerted by the FSW tool on the workpiece and the torque of the spindle actuator. Then, the weld torque setting for each weld actuator can be determined based upon the relationship between the force exerted by the FSW tool along each axis and the torque of the weld actuator, and based upon the force that must be exerted by the FSW tool on the workpiece along the weld path to perform the friction stir welding operation. Similarly, the spindle torque setting for the spindle actuator can be determined based upon the relationship between the rotational force exerted by the FSW tool on the workpiece and the torque of the spindle actuator, and based upon the rotational force that must be exerted by the FSW tool on the workpiece to perform the friction stir welding operation. As before, the forces that must be exerted by the FSW tool along the weld path, and the rotational force that must be exerted by the FSW tool, can be determined in accordance with any of a number of conventional techniques.

Referring now to FIG. 6, irrespective of how the weld torque settings for the weld actuators 12B, and the spindle torque setting for the spindle actuator 12C, are determined, the friction stir welding operation according to this embodiment generally begins by forcing the probe 24 into contact with the workpiece 16 to the desired depth, as shown in block 58. The probe can be forced into contact with the workpiece in accordance with any of a number of techniques, but in one advantageous embodiment, the workpiece is forced into contact with the workpiece in accordance with the technique described above (see FIG. 5). After forcing the probe into contact with the workpiece, the probe can be moved along the weld path of the workpiece, as shown in block 60. As the probe moves along the weld path (see block 44 of FIG. 5), the controller 18 can drive the torques of the weld actuators within a range about respective weld torque settings. Similar to before, the range about the weld torque settings can comprise any of a number of different ranges, such as a tolerance range that facilitates the FSW device 12 and FSW tool 14 performing friction stir welding operations resulting in robust welds of known properties, although the range can be set equal to zero. Further, although the range about each weld torque setting can be the same, the range about each weld torque setting can instead be different without departing from the spirit and scope of the present invention.

As the weld actuators 12B are driven with torques within the range of the respective weld torque settings, the weld actuators will move the FSW tool 14 along each axis of the weld path at a speed along each axis such that the FSW tool exerts a force on the workpiece along each axis in relation to the respective weld actuator torques. And as the weld actuators move the FSW tool along the weld path of the workpiece 16 to form the weld along the weld path, the controller can continue to control the FSW device 12 to drive the weld actuators so as to maintain the torques of the weld actuators within the range about the respective weld torque settings. To maintain the torques of the weld actuators 12B within the respective ranges about the weld torque settings, the controller 18 can continue to monitor the torques of the weld actuators as the FSW tool moves along the weld path. More particularly, the controller can continue to monitor the torques of the weld actuators to determine whether the torques remain within the range about the respective weld torque settings, as shown in block 62.

As the FSW tool 14 moves along the weld path, if the torque of one or both of the weld actuators 12B, as determined by the controller 18, increases above the range about the respective weld torque setting(s), the controller can control the FSW device 12 to drive the respective weld actuator(s) to move the FSW tool along the respective axis or axes to bring the torque(s) back within the range. In this regard, the controller can control the FSW device to drive one or both of the weld actuators to decrease the speed at which the FSW tool moves along the respective axis or axes of the weld path, as shown in block 64. The weld actuator(s) can continue to decrease the speed of FSW tool until the controller determines the torque(s) of the weld actuator(s) are again within the range about the weld torque setting(s).

If the torque of one or more of the weld actuators 12B, as determined by the controller 18, decreases below the range about the respective weld torque setting(s), the controller can again control the FSW device 12 to drive the respective weld actuator(s) to move the FSW tool along the respective axis or axes to bring the torque(s) back within the range. More particularly, the controller can control the FSW device to drive one or both of the weld actuators to increase the speed at which the FSW tool moves along the respective axis or axes of the weld path, as shown in block 66. The weld actuator(s) can continue to increase the speed of FSW tool until the controller determines the torque(s) of the weld actuator(s) are again within the range about the weld torque setting(s). Thus, by controlling the torques of the weld actuators, the controller can indirectly control the forces exerted by the FSW tool on the workpiece along the tool path.

Also as the probe 24 moves along the weld path, the controller 18 can drive the torque of the spindle actuator within a range about the spindle torque setting. As before, the range about the spindle torque setting can comprise any of a number of different ranges, although the range can be set equal to zero. As the spindle actuator 12C is driven with a torque within the range of the spindle torque setting, the spindle actuator will rotate the FSW tool 14 as the FSW tool contacts the workpiece 16 at a rotational speed such that the FSW tool exerts a rotational force on the workpiece. Then, as before, as the weld actuators 12B move the FSW tool along the weld path of the workpiece 16 to form the weld along the weld path, the controller can continue to control the FSW device 12 to drive the spindle actuator so as to maintain the torque of the spindle actuator within the range about the spindle torque settings. To maintain the torque of the spindle actuator within the range about the spindle torque setting, the controller can continue to monitor the torque of the spindle actuator as the FSW tool moves along the weld path. In this regard, the controller can continue to monitor the torque of the spindle actuator to determine whether the torque remains within the range about the spindle torque setting, as shown in block 68.

As the FSW tool 14 moves along the weld path, if the torque the spindle actuator 12C, as determined by the controller 18, increases above or decreases below the range about the spindle torque setting, the controller can control the FSW device 12 to drive the spindle actuator to rotate the FSW tool to bring the torque back within the range. For example, when the torque of the spindle actuator increases above the range about the spindle torque setting, the controller can control the FSW device to drive the spindle actuator to increase the rotational speed of the FSW tool, as shown in block 70. Alternatively, when the torque of the spindle actuator decreases below the range about the spindle torque setting, the controller can control the FSW device to drive the spindle actuator to decrease the rotational speed of the FSW tool, as shown in block 72. The spindle actuator can continue to increase or decrease the speed of FSW tool until the controller determines the torque of the spindle actuator is again within the range about the spindle torque setting.

By correlating the torque of the plunge actuator 12A to the force exerted by the FSW tool 14 on the workpiece 16 along the plunge axis, the torque of the weld actuator(s) 12B to the force of the FSW tool on the workpiece along the weld path, and/or the torque of the spindle actuator 12C to the rotational force of the FSW tool on the workpiece, the FSW device 12 embodiments of the present invention can advantageously comprise a conventional device, such as a conventional CNC machine, capable of friction stir welding operations as well as operations, such as machining components, outside friction stir welding. As will be appreciated, machines such as CNC machines are more prevalent than dedicated friction stir welding devices. In this regard, many companies desiring to perform friction stir welding may already own CNC machines, and may not desire to purchase dedicated friction stir welding devices to perform friction stir welding. Further, by utilizing a FSW device capable of operations outside friction stir welding, manufacturing efficiency can increase as the FSW device can be operated with decreased downtime.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A friction stir welding system comprising:
   a friction stir welding (FSW) device comprising an actuator configured for moving a FSW tool relative to a workpiece, wherein the actuator comprises a plunge actuator configured for moving the FSW tool along a plunge axis; and
   a controller configured for controlling the FSW device to drive the actuator to move the FSW relative to the workpiece such that the FSW tool is configured for performing a friction stir welding operation on the workpiece, wherein the controller is configured for monitoring a torque of the actuator in accordance with one or more numerical control instructions designed for machining components, wherein the controller is configured for controlling the FSW device to drive the actuator such that the torque is maintained within a range about a torque setting, and wherein the controller is configured for controlling the FSW device such that the plunge actuator is driven to move the FSW tool into further contact with the workpiece when the torque decreases below a range about a plunge torque setting, and driven to move the FSW tool into reduced contact with the workpiece when the torque increases above the range about the plunge torque setting.

2. A friction stir welding system according to claim 1, wherein the controller is configured for controlling the FSW device such that, when the torque decreases below the range about the plunge torque setting, the plunge actuator is driven to move the FSW tool into further contact with the workpiece until one of the torque increases to within the range and the FSW tool has moved more than a defined distance along the plunge axis.

3. A friction stir welding system according to claim 1, wherein the actuator comprises at least one weld actuator configured for moving the FSW tool along a weld path, wherein the controller is configured for controlling the FSW device such that the at least one weld actuator is driven to move the FSW tool with increased speed along the weld path when at least one torque of the at least one weld actuator decreases below a range about at least one weld torque setting, and driven to move the FSW tool with decreased speed along the weld path when the at least one torque increases above the range about the at least one weld torque setting.

4. A friction stir welding system according to claim 1, wherein the actuator comprises a spindle actuator configured for rotating the FSW tool relative to the workpiece, wherein the controller is configured for controlling the FSW device such that the spindle actuator is driven to rotate the FSW tool with decreased rotational speed relative to the workpiece when the torque decreases below a range about a spindle torque setting, and driven to rotate the FSW tool with increased rotational speed relative to the workpiece when the torque increases above the range about the spindle torque setting.

5. A friction stir welding (FSW) assembly comprising:
   a FSW tool configured for performing a friction stir welding operation on a workpiece; and
   a friction stir welding (FSW) device comprising an actuator, wherein the actuator is configured for being driven to move the FSW tool relative to the workpiece such that the FSW tool is configured for performing the friction stir welding operation, wherein the actuator comprises a plunge actuator configured for being driven to move the FSW tool along a plunge axis, wherein a torque of the actuator is configured for being monitored in accordance with one or more numerical control instructions designed for machining components, wherein the actuator is configured for being driven such that the torque is maintained within a range about a torque setting, and wherein the plunge actuator is configured for being driven to move the FSW tool into further contact with the workpiece when the torque decreases below a range about a plunge torque setting, and driven to move the FSW tool into reduced contact with the workpiece when the torque increases above the range about the plunge torque setting.

6. A FSW assembly according to claim 5, wherein when the torque decreases below the range about the plunge torque setting, the plunge actuator is configured for being driven to move the FSW tool into further contact with the workpiece until one of the torque increases to within the range and the FSW tool has moved more than a defined distance along the plunge axis.

7. A FSW assembly according to claim 5, wherein the actuator comprises at least one weld actuator configured for being driven to move the FSW tool along a weld path, wherein the at least one weld actuator is configured for being driven to move the FSW tool with increased speed along the weld path when at least one torque of the at least one weld actuator decreases below a range about at least one weld torque setting, and driven to move the FSW tool with decreased speed along the weld path when the at least one torque increases above the range about the at least one weld torque setting.

8. A FSW assembly according to claim 5, wherein the actuator comprises a spindle actuator configured for being driven to rotate the FSW tool relative to the workpiece, wherein the spindle actuator is configured for being driven to rotate the FSW tool with decreased rotational speed relative to the workpiece when the torque decreases below a range about a spindle torque setting, and driven to move the FSW tool with increased rotational speed relative to the workpiece when the torque increases above the range about the spindle torque setting.

9. A controller comprising: a processing element configured for driving an actuator to move a friction stir welding (FSW) tool relative to a workpiece such that the FSW tool is configured for performing a friction stir welding operation on the workpiece, wherein the actuator comprises a plunge actuator configured for moving the FSW tool along a plunge axis, wherein the controller is configured for monitoring a torque of the actuator in accordance with one or more numerical control instructions designed for machining components, wherein the controller is configured for driving the actuator such that the torque is maintained within a range about a torque setting, and wherein the processing element is configured for driving the plunge actuator to move the FSW tool into further contact with the workpiece when the torque decreases below a range about a plunge torque setting, and driving the plunge actuator to move the FSW tool into reduced contact with the workpiece when the torque increases above the range about the plunge torque setting.

10. A controller according to claim 9, wherein the processing element is configured for driving the plunge actuator such that, when the torque decreases below the range about the plunge torque setting, the plunge actuator moves the FSW tool into further contact with the workpiece until one of the torque increases to within the range and the FSW tool has moved more than a defined distance along the plunge axis.

11. A controller according to claim 9, wherein the actuator comprises at least one weld actuator configured for moving the FSW tool along a weld path, wherein the processing element is configured for driving the at least one weld actuator to move the FSW tool with increased speed along the weld path when at least one torque of the at least one weld actuator decreases below a range about at least one weld torque setting, and driving the at least one weld actuator to move the FSW tool with decreased speed along the weld path when the torque increases above the range about the at least one weld torque setting.

12. A controller according to claim 9, wherein the actuator comprises a spindle actuator configured for rotating the FSW tool relative to the workpiece, wherein the processing element is configured for driving the spindle actuator to rotate the FSW tool with decreased rotational speed relative to the workpiece when the torque decreases below a range about a spindle torque setting, and driving the spindle actuator to rotate the FSW tool with increased rotational speed relative to the workpiece when the torque increases above the range about the spindle torque setting.

13. A method of friction stir welding a workpiece comprising:
    driving an actuator to move a friction stir welding (FSW) tool relative to the workpiece such that the FSW tool performs a friction stir welding operation on the workpiece, wherein the actuator comprises a plunge actuator configured for moving the FSW tool along a plunge axis;
    monitoring a torque of the actuator in accordance with one or more numerical control instructions designed for machining components; and
    controlling the torque such that the torque is maintained within a range about a torque setting as the actuator is driven to move the FSW tool, wherein controlling a torque comprises controlling a torque of the plunge actuator such that the plunge actuator is driven to move the FSW tool into further contact with the workpiece when the torque decreases below a range about a plunge torque setting, and driven to move the FSW tool into reduced contact with the workpiece when the torque increases above the range about the plunge torque setting.

14. A method according to claim 13, wherein controlling a torque comprises controlling a torque of the plunge actuator such that, when the torque decreases below the range about the plunge torque setting, the actuator is driven to move the FSW tool into further contact with the workpiece until one of the torque increases to within the range and the FSW tool has moved more than a defined distance along the plunge axis.

15. A method according to claim 13, wherein the actuator comprises at least one weld actuator configured for moving the FSW tool along a weld path, wherein controlling a torque comprises controlling at least one torque of the at least one weld actuator such that the at least one weld actuator is driven to move the FSW tool with increased speed along the weld path when the at least one torque decreases below a range about at least one weld torque setting, and driven to move the FSW tool with decreased speed along the weld path when the at least one torque increases above the range about the at least one weld torque setting.

16. A method according to claim 13, wherein the actuator comprises a spindle actuator configured for rotating the FSW tool relative to the workpiece, wherein controlling a torque comprises controlling the torque of the spindle actuator such that the spindle actuator is driven to move the FSW tool with decreased rotational speed relative to the workpiece when the torque decreases below a range about a spindle torque setting, and driven to move the FSW tool with increased rotational speed relative to the workpiece when the torque increases above the range about the spindle torque setting.

17. A friction stir welding system according to claim 1, wherein the friction stir welding device comprises a computer numerically controlled mill machine designed for machining components.

18. A FSW assembly according to claim 5, wherein the FSW device comprises a computer numerically controlled mill machine designed for machining components.

19. A controller according to claim 9, wherein the actuator comprises an actuator of a computer numerically controlled mill machine designed for machining components.

20. A method according to claim 13, wherein driving an actuator comprises driving an actuator of a computer numerically controlled mill machine designed for machining components.

* * * * *